United States Patent [19]
Cooley et al.

[11] Patent Number: 5,830,921
[45] Date of Patent: Nov. 3, 1998

[54] CATION EXCHANGE MEMBRANES AND METHOD FOR THE PREPARATION OF SUCH MEMBRANES

[75] Inventors: Graham Edward Cooley, Oxon, United Kingdom; Vincent F. D'Agostino, Dix Hills, N.Y.

[73] Assignee: National Power PLC, Wiltshire, United Kingdom

[21] Appl. No.: 764,303

[22] Filed: Dec. 12, 1996

Related U.S. Application Data

[60] Division of Ser. No. 418,997, Apr. 7, 1995, Pat. No. 5,626,731, which is a continuation-in-part of Ser. No. 226,825, Apr. 13, 1994, abandoned.

[51] Int. Cl.⁶ .............................. C08J 5/22; C25B 13/04
[52] U.S. Cl. .................. 521/27; 521/30; 521/31; 521/28; 204/252; 204/296
[58] Field of Search .................. 521/27, 30, 31, 521/28; 204/296, 252

[56] References Cited

U.S. PATENT DOCUMENTS

| | | | |
|---|---|---|---|
| 3,787,309 | 1/1974 | Neti | 204/195 M |
| 4,666,574 | 5/1987 | Oda | 204/98 |
| 5,242,597 | 9/1993 | McArdle | 210/652 |

*Primary Examiner*—Fred Zitomer
*Attorney, Agent, or Firm*—Antonelli, Terry, Stout, & Kraus, LLP

[57] ABSTRACT

A modified polymeric cation exchange membrane for use in an electrochemical cell, the said membrane having a salt selected from the group consisting of silver, tungsten, molybdenum and a mixture thereof deposited within the polymer matrix, the said salt being insoluble in the electrolytes which, in use, contact either side of the membrane.

The membranes are of particular use in electrochemical cells and combine a low electrolytic resistivity with a high permselectivity.

9 Claims, 4 Drawing Sheets

CATION EXCHANGE MEMBRANES AND METHOD FOR THE PREPARATION OF SUCH MEMBRANES

This is a division of application Ser. No. 08/418,997, filed Apr. 7, 1995, now U.S. Pat. No. 5,626,731, which is a continuation-in-part of application Ser. No. 08/226,825, filed Apr. 13, 1994, now abandoned.

This application is a Continuation-in-Part of my U.S. patent application Ser. No. 08/226,825 filed 13th Apr., 1994.

BACKGROUND OF THE INVENTION

The present invention relates to improvements in or relating to cation exchange membranes for use in electrochemical cells and, in particular, to strongly cationic selective membranes which combine a low electrolytic resistivity with a high permselectivity, and to a method for the production thereof.

Cation exchange membranes have been proposed for use in various electrochemical applications, including chlor-alkali cells, fuel cells and energy storage/power delivery devices. In these devices, the cation exchange membrane serves to separate the compartments of the cells, whilst providing a conducting pathway for cations through the cell. For certain applications, such as for use in the chlor-alkali process or fuel cell applications, the membranes may also have metallic catalytic electrodes formed on the surface thereof. Proposals for the preparation of such membrane/electrode composites include the process as disclosed in U.S. Pat. No. 4,959,132 whereby a metallic catalytic film is formed on the surface of the membrane by the reduction of a water soluble metallic salt impregnated into the membrane to form the metal.

For use in electrochemical applications, a cation exchange membrane requires a high voltage efficiency, i.e. a low resistance. Low resistance membranes generally have a high water content and are not very selective, i.e. have a low current efficiency. What is required is a membrane with both low resistance and high selectivity.

PRIOR ART

In order to improve the permselectivity of cation exchange membranes, i.e. the ability of the membrane to allow cations to pass through it, whilst not allowing anions to pass through it, various approaches have been adopted.

One approach has been to make bi-layer membranes in which a low resistance membrane is surfaced on one side with an anion rejection layer of lower water content. This bi-layer membrane has a low resistance bulk portion with a surface layer which is highly cationically selective. Examples of such membranes are those in which a low ion exchange capacity (high equivalent weight) membrane provides the anion rejection surface layer (DuPont Nafion 300 series) and those in which a carboxylic acid membrane provides the anion rejection surface layer (DuPont Nafion 900 Series). These bi-layer membranes are surfaced on one side only for anion rejection in a specified direction. In both cases (300 and 900), anion rejection is achieved by reducing the water content of the surface of the membrane.

Another approach has been to precipitate silicon dioxide into Nafion sulfonic acid membranes in order to decrease the water content of the membrane. (Multiphase polymers-:blends and ionomers, Chapter 16, L. A. Utracki and R. A. Weiss, ACS Symposium series 395, Jun. 5–11 1988, p 401–417). This treatment results in an improved selectivity of the membrane by reducing the water content of the membrane, but increases the membrane resistance.

We have now developed a method of decreasing the water content of a cation exchange membrane, whilst retaining the same ion exchange capacity and permselectivity. The cation exchange membranes so produced have a low electrolytic resistivity with a high permselectivity.

SUMMARY OF THE INVENTION

Accordingly, the present invention provides a modified polymeric cation exchange membrane for use in an electrochemical cell; the membrane has an ionic salt which is a silver, tungsten or molybdenum salt or a mixture thereof, deposited within the polymer matrix, the salt being insoluble in the electrolytes which, in use, contact either side of the membrane.

DETAILED DESCRIPTION OF THE INVENTION

Figure 1A:
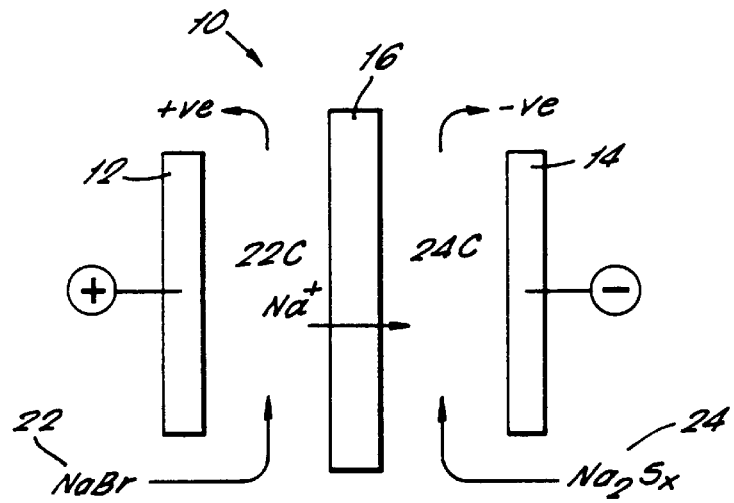
FIG. 1A is a schematic view of the basic components of a cell according to a preferred embodiment of the invention.

The insoluble ionic salt which is deposited within the polymer matrix of the membrane is preferably a bromide, chloride, sulfide or hydroxide of silver, tungsten or molybdenum, or mixtures thereof. It will be understood that, if desired, different insoluble salts may be deposited in the membrane at either side thereof.

One membrane which may be modified according to the present invention is a cation exchange membrane formed from a fluorocarbon polymer grafted with styrene via gamma irradiation and subsequently sulfonated to give sulfonic acid pendant chains or grafted via gamma irradiation with an unsaturated carboxylic acid, such as acrylic or methacrylic acid, to give carboxylic acid pendant chains. The fluorocarbon is preferably polytetrafluoroethylene, or a fluorinated ethylene-propylene copolymer. The membrane is prepared by grafting the styrene onto the fluorocarbon polymer using gamma irradiation and then sulfonating the grafted polymer, for example by using chlorosulfonic acid, or grafting an unsaturated carboxylic acid onto the fluorocarbon polymer using gamma irradiation.

The modified membrane of the present invention is preferably from 0.005 to 0.0175 cm (0.002 to 0.007 inches) thick, more preferably about 0.0125 cm (0.005 inches) thick. The membranes which are modified are made from a polytetrafluoro-ethylene or an ethylene-propylene copolymer base film of the desired thickness which is grafted with styrene via gamma irradiation, for example from a cobalt-60 source. The radiation grafting of vinyl-substituted monomers to polytetrafluoroethylene and polyolefin films is known in the art and reference is made to U.S. Pat. Nos. 4,230,549 and 4,339,473.

The gamma irradiation of the fluorocarbon polymer forms free radical sites which are then available for reaction with an unsaturated monomer, such as styrene. The electrolytic resistance of the ion exchange membrane is related to the percentage of styrene grafted thereon when subsequently sulfonated, the electrolytic resistance decreasing as the percent graft increases. In general, the useful range of the percent graft is from 10 to 50 percent, more preferably 10 to 20 percent. Percent graft is defined as the weight increase due to grafting divided by the initial weight of the polymer film multiplied by 100.

Another membrane which may be modified according to the present invention is a cation exchange membrane formed from a copolymer of tetrafluoroethylene and a sulfonated or carboxylated vinyl ether, such as those sold under the trade names of Nafion (Du Pont), for example Nafion 112,115 or 117, and Flemion (Asahi Glass).

Another membrane which may be modified according to the invention is a cation exchange membrane which is a polystyrene sulfonate membrane from Tokuyama Soda sold as Neosepta CM1, Neosepta CM2, Neosepta CMH and Neosepta CMS, and Selemion (Asahi Glass).

Other membranes which may be used in the present invention are heterogeneous membranes such as those based on polystyrene sulfonate ion exchange resin blended with another polymer such as polyethylene. Another type of membrane which may be used is a post-irradiation grafted membrane. Yet another type of membrane which may be used is a cross-linked aromatic polyamide, for example of the Kelvar type.

The cation exchange membranes may be modified by a method which comprises the steps of i) contacting the membrane with an aqueous solution of a water soluble salt of silver, tungsten, molybdenum or mixtures thereof, and ii) converting the water soluble salt from step (i) into an insoluble salt.

Preferably, the membrane is dehydrated prior to the treatment in step (i) above. The dehydration assists in the membrane absorbing the solution of the water soluble salt in a uniform manner.

The preferred water soluble salts for use in the method described above are the nitrates, although other salts may be used, such as the perchlorates or fluorides.

The water soluble salt absorbed into the membrane is generally converted into a water insoluble salt by precipitation from solution in the membrane matrix. The preferred water insoluble salts are the bromides, chlorides, sulfides and hydroxides of the said metals which may be precipitated in the polymer matrix of the membrane by treating the membrane with suitable bromide, chloride, sulfide or hydroxyl ion containing solutions, such as sodium or potassium bromide, chloride, sulfide or hydroxide. Alternatively, the bromides may be formed by precipitation using bromine gas. The bromine gas may be used in admixture with an inert gas such as nitrogen.

Using the method of the present invention, it is possible to prepare a modified cation exchange membrane which has dissimilar insoluble salts deposited within the membrane at either side thereof. This may be achieved by placing the membrane from step (i) in a reactor cell and exposing one surface to treatment with one reagent and the other surface to treatment with another reagent, whereby two different insoluble salts are precipitated within the polymer matrix of the membrane.

For example, one surface of the membrane may be exposed to a bromide containing solution or bromine gas to form an insoluble bromide and the other surface of the membrane may be exposed to a sulfide containing solution to form an insoluble sulfide.

It will be appreciated that the insoluble ionic salt or salts which is/are precipitated into the polymeric matrix of the membrane must be chemically resistant to the anolyte and the catholyte to which they will be exposed in use. Thus, the ionic salt is not only insoluble in the electrolytes, but also is not reduced, oxidized or modified in any other way by the electrolyte to which it is exposed during use. With the possibility of forming different insoluble salts within the polymeric matrix on either side of the membrane, the membrane can be tailored to the anolyte and catholyte individually.

The present invention includes within its scope an electrochemical apparatus which comprises a single cell or an array of cells, each cell with a positive (hereinafter "$+^{ve}$") chamber ($+^{ve}$ chamber) containing a $+^{ve}$ electrode and an electrolyte and a (negative hereinafter "$-^{ve}$") chamber ($-^{ve}$ chamber) containing a $-^{ve}$ electrode and an electrolyte, the said $+^{ve}$ chamber(s) and $-^{ve}$ chamber(s) being separated from one another by a modified cation exchange membrane.

The electrochemical apparatus into which the modified membrane of the present invention is incorporated is preferably an apparatus for energy storage and/or power delivery. The electrolyte in the $-^{ve}$ chamber of the electrochemical apparatus preferably contains a sulfide during power delivery, whilst the electrolyte in the $+^{ve}$ chamber of the electrochemical apparatus preferably contains bromine, iron, air or oxygen. The chemical reactions which are involved in these three systems are as follows:

$$Br_2 + S^{2-} \rightleftharpoons 2Br^- + S \quad (1)$$

The above reaction actually occurs in separate but dependent bromine and sulfur reactions; the bromine reaction takes place on the $+^{ve}$ side of the membrane and the sulfur reaction on the $-^{ve}$ side of the membrane.

$$2Fe^{3+} + S^{2-} \rightleftharpoons 2Fe^{2+} + S \quad (2)$$

Once again, this reaction actually occurs in separate but dependent iron and sulfur reactions; the iron reaction takes place on the $+^{ve}$ side of the membrane and the sulfur reaction on the $-^{ve}$ side of the membrane.

$$4H_2O + 4S^{2-} + 2O_2 \rightleftharpoons 8OH^- + 4S \quad (3)$$

This reaction also actually occurs in separate but dependent oxygen and sulfur reactions; the oxygen reaction takes place on the $+^{ve}$ side of the membrane and the sulfur reaction on the $-^{ve}$ side of the membrane.

For use in the bromine/sulfur system described above, a modified membrane is preferred which is bi-functional; the side of the membrane facing the bromine side of the cell has silver, tungsten or molybdenum bromide, or a mixture thereof, precipitated therein and the side of the membrane facing the sulfide side of the cell has silver, tungsten or molybdenum sulfide, or a mixture thereof, precipitated therein.

The present invention will be further described with reference to electrochemical apparatus incorporating a modified membrane as illustrated in the accompanying drawings.

In the following description, reference is made to a specific system utilizing sodium bromide/sodium polysulfide. It will be understood, however, that other salts may be substituted for these salts, as appropriate.

Referring to the drawings, FIG. 1A shows a cell 10 with a $+^{ve}$ electrode 12 and a $-^{ve}$ electrode 14 and a cation membrane 16 formed from a fluorocarbon polymer with styrene sulfonic acid functional groups to provide charge carriers which is modified by incorporating silver bromide into the polymer matrix on the side facing compartment 22C and silver sulfide into the polymer matrix on the side facing compartment 24C. The membrane 16 acts to separate the $+^{ve}$ and $-^{ve}$ sides of the cell 10 and is selected to minimize migration of bromine from the $+^{ve}$ side to the $-^{ve}$ side and to minimize migration of $S^{2-}$ ions from the $-^{ve}$ side to the $+^{ve}$ side. An aqueous solution 22 of NaBr is provided in a chamber 22C formed between the $+^{ve}$ electrode 12 and the membrane 16 and an aqueous $Na_2S_x$ solution 24 is provided in a chamber 24C formed between the $-^{ve}$ electrode 14 and the membrane 16.

When the cell is in the discharged state, a solution of NaBr of up to 6.0 molar concentration exists in the chamber 22C of the cell and a solution of $Na_2S_5$ at 0.5 to 1.0 molar, exists in chamber 24C of the cell.

As the cell is charged, Na+ ions are transported through the cation membrane 16, as shown in FIG. 1A, from the $+^{ve}$ to the $-^{ve}$ side of the cell. Free bromine is produced via oxidation of the bromide ions at the $+^{ve}$ electrode and dissolves as a tribromide or pentabromide ion. Sulfur is reduced at the $-^{ve}$ electrode and the pentasulfide, $Na_2S_5$, salt eventually becomes the monosulfide as the charging proceeds to completion. At the $+^{ve}$ side, the following reaction occurs,

$$2Br^- \rightarrow Br_2 + 2e^-$$

and at the $-^{ve}$ side, the following reaction occurs,

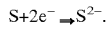

$$S + 2e^- \rightarrow S^{2-}.$$

The membrane separates the two electrolytes and prevents bulk mixing and also retards the migration of $S^{2-}$ ions from the $-^{ve}$ side, and the migration (diffusion) of $Br^-$ and $Br_2$ from the $+^{ve}$ to the $-^{ve}$ side. Diffusion of $S^{2-}$ results in coulombic loss as well as suspended precipitates in the $+^{ve}$ electrolyte. Any $S^{2-}$ ions present in the $+^{ve}$ side will be oxidized by the $Br_2$ produced during charge. The sulfur is not soluble in water or NaBr solution and will come out as a fine powder suspension or precipitate.

With extended cycling, there may be an accumulation of sulfur in the $+^{ve}$ side of the cell. If the sulfur is trapped by an in-line filter, it can be returned to the $-^{ve}$ side for re-solubilizing at suitable times during operation.

When providing power, the cell is discharging. During this action, reversible reactions occur at the two electrodes. At the $+^{ve}$ side electrode 12, bromine is reduced to $Br^-$, and at the $-^{ve}$ electrode, the $S^{-2}$ ion is oxidized to molecular S. The electrons produced at the $-^{ve}$ electrode form the current through a load. The chemical reaction at the $+^{ve}$ electrode produces 1.06 to 1.09 volts and the chemical reaction at the $-^{ve}$ electrode produces 0.48 to 0.52 volts. The combined chemical reactions produce an open circuit voltage of 1.54 to 1.61 volts per cell.

Figure 1B:
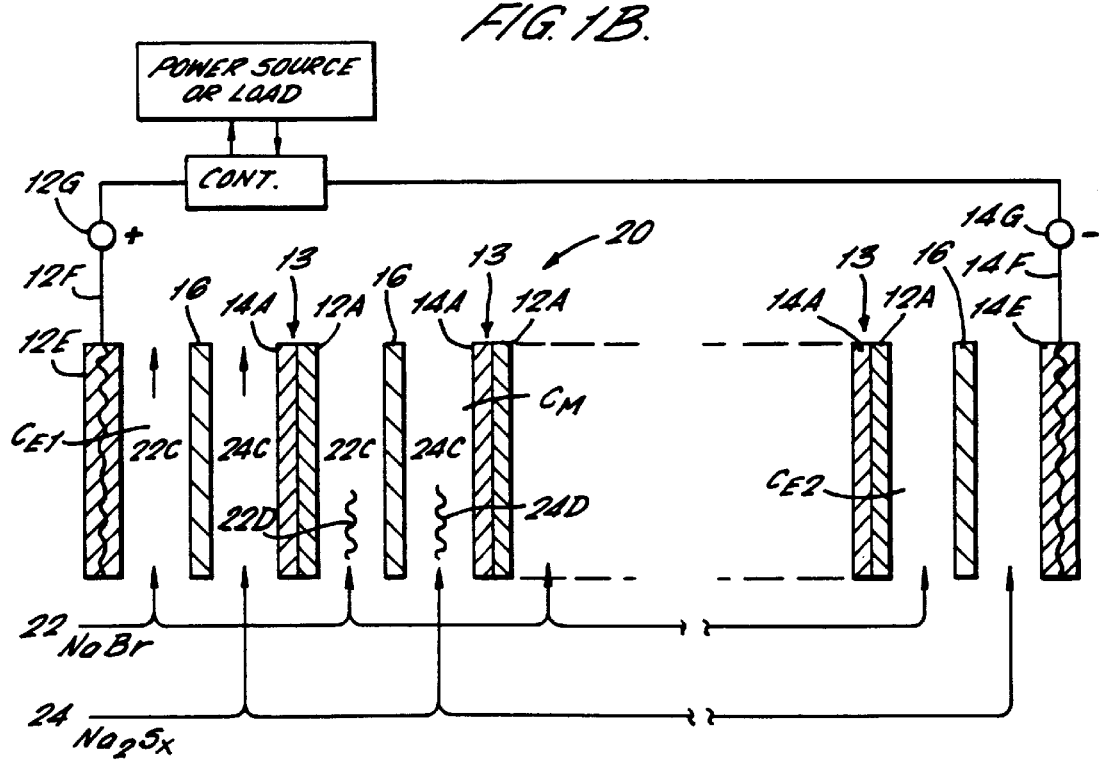
FIG. 1B is a diagram of cell arrays using the system of FIG. 1A.

FIG. 1B shows a cell array 20 of multiple cells connected in electrical series and fluid parallel. Multiple mid-electrodes 13 (each one having a $+^{ve}$ electrode side 12A and $-^{ve}$ electrode side 14A) and end electrodes 12E ($+^{ve}$) and 14E ($-^{ve}$) are spaced out from each other by membranes 16 and screen or mesh spacers (22D,24D) in all the cell chambers 22C, 24C, (portions of two of which 22D, 24D are shown by way of example) to form end cells $C_{E1}$ and $C_{E2}$ and an array of n# of mid cells $C_M$ (typically 10–20; but note much smaller and much higher numbers of cells can be accommodated). The membranes 16 are of the type as hereinbefore described with reference to FIG. 1A. The end electrodes 12E ($+^{ve}$) and 14E ($-^{ve}$) have internal conductors 12F and 14F (typically copper screens) encapsulated therein and leading to external terminals 12G, 14G which are connected to external loads (e.g. to motor(s) via a control circuit (CONT), the motor(s) driving a vehicle) or power sources (e.g. a utility power grid when used as a load-levelling device).

The present invention will be further described with reference to the following Examples.

EXAMPLE 1

A polytetrafluoroethylene film radiation grafted with about 15% styrene and functionalized to contain about 17% sulfonic acid groups was obtained from RAI Corporation. The film had a thickness of about 0.0125 cm (0.005 inches).

A sample of this membrane was dried in a drying oven at 40° C. for ten minutes. After drying, the dried membrane, together with a sample of the original membrane which had not been subjected to the drying procedure, were immersed in an aqueous silver nitrate solution comprising 20 g $AgNO_3$ per liter for ten minutes. After immersion, both membrane samples were allowed to drip for 30 seconds before being immersed in an aqueous sodium sulfide solution comprising 30.0 g $Na_2S.9H_2O$ per liter at 60° C. for ten minutes. After this treatment, the membrane samples which were black were then dried.

The membrane resistances for the membranes in which silver sulfide was deposited and for an untreated sample of the membrane from RAI Corporation were measured in a two compartment cell containing platinum electrodes immersed in the solutions in both compartments of the cell. The membrane under investigation was used to separate the compartments of the cell. The platinum electrodes were connected to a Philips Digital Conductivity Meter PW 9527 allowing measurements to be made at 80 and 4000 Hz. The solutions in the cell were thermostatted to 25° C., the conductivity meter was calibrated before any measurements were taken and the value of the conductivity was read.

The membrane resistances were determined as the differences between values measured with and without the membrane in the cell.

Table 1 gives the ionic AC resistivity of membranes in 0.1M NaBr, $Na_2S$ and $Na_2S_x$ solutions. Area resistances $R_A$ are in $\Omega/cm^2$, specific resistances $R_s$ are in $\Omega cm$. Mean values are given. The various membrane samples on which measurements were made are A—as received from RA1
B—modified by $AgNO_3$ doping without dehydration
CI—modified by $AgNO_3$ doping with dehydration (first sample)
CII—modified by $AgNO_3$ doping with dehydration (second sample)

TABLE 1

| Membrane | Frequence | NaBr | | $Na_2S$ | | $Na_2S_x$ | |
|---|---|---|---|---|---|---|---|
| | | $R_A$ | $R_S$ | $R_A$ | $R_S$ | $R_A$ | $R_S$ |
| A | 80 Hz | 3.08 | 175.9 | 2.30 | 179.8 | 1.90 | 108.8 |
| | 4 kHz | 2.73 | 156.2 | 2.18 | 170.0 | 1.89 | 107.7 |
| B | 80 Hz | 1.57 | 87.0 | 1.56 | 85.4 | 4.70 | 255.8 |
| | 4 kHz | 1.78 | 98.7 | 2.16 | 118.0 | 4.85 | 265.0 |
| CI | 80 Hz | 3.39 | 180.1 | 4.25 | 235.8 | 3.59 | 190.9 |
| | 4 kHz | 3.01 | 159.9 | 4.16 | 221.0 | 3.14 | 167.2 |
| CII | 80 Hz | 2.98 | 160.9 | 3.16 | 170.7 | 1.77 | 95.7 |
| | 4 kHz | 2.84 | 153.7 | 2.93 | 158.5 | 1.97 | 106.2 |

The equilibrium volume swelling and mass water uptake of the membrane with and without doping with $AgNO_3$ were measured using samples of rectangular shape (size 4×1 cm). The dimensions (length, width) of swollen and dried samples were measured using an optical comparator and the mass was determined by weighing. The results are given in Table 2 below.

TABLE 2

| Membrane | Change in vol. Initial vol. × 100 (%) | | | Change in weight Initial weight × 100 (%) | | |
| --- | --- | --- | --- | --- | --- | --- |
| | $D_1$ | $D_2$ | $D_3$ | $D_1$ | $D_2$ | $D_3$ |
| A | 41.0 | 46.2 | * | 22.0 | 27.0 | 28.5 |
| CI | 18.5 | 21.6 | * | 12.2 | 14.6 | 17.0 |
| CII | 21.6 | 27.0 | * | 12.5 | 15.0 | 16.2 |

$D_1$ - drying, T = 25° C., air
$D_2$ - drying, T = 25° C., over $P_2O_5$
$D_3$ - drying, T = 105° C., 13 Pa
*deformation of samples It can be seen that both the volume swelling and mass water uptake of the doped membrane samples, CI and CII are significantly less than those of the undoped membrane A.

The ion exchange capacities of the membranes by direct titration of the membrane with NaOH are given in Table 3 below.

TABLE 3

| Membrane | Ion exchange capacity (meq/g dry membrane) |
| --- | --- |
| A | 0.943 |
| B | 0.936 |
| CI | 0.917 |
| CII | 0.936 |
| Nafion | 1.035 |

EXAMPLE 2

A Nafion 117 membrane was pretreated by boiling in a 50/50 mixture of nitric acid (s.g. 1.42) and high purity water for 30 minutes. The membrane was rinsed and then boiled in high purity water for 30 minutes. The membrane was dried with paper towels and immersed in 0.1M HCl at room temperature with stirring for 48 hours to give the hydrogen ($H^+$) form of the membrane.

The membrane was immersed in an aqueous solution of silver nitrate ($5 \times 10^{-3}$M), stirred continuously and kept in the dark for approximately 4 weeks.

The membrane impregnated with the silver salt was rinsed in high purity water, dried with paper towels and immersed in a concentrated solution of sodium sulfide (2.4M) for 24 hours at room temperature. The membrane was then rinsed several times with high purity water and stored wet.

The ion exchange capacity of the treated Nafion 117 membrane was 0.95 meq/g as compared to 0.96 meq/g for the untreated Nafion 117 membrane.

Figure 2:
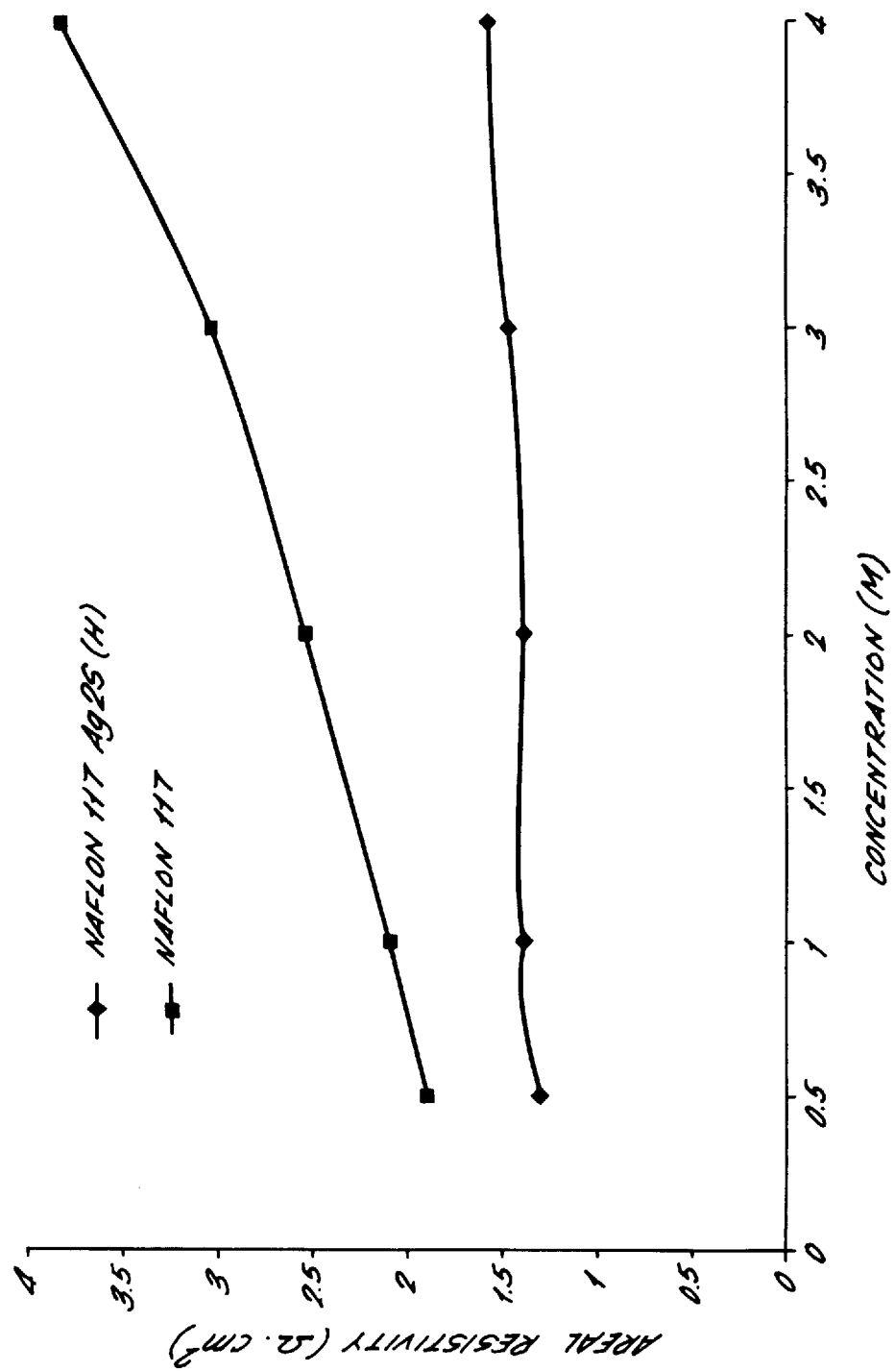
FIG. 2 is a graph showing resistivity vs. concentration for untreated and treated membranes according to Example 2.

The membrane resistances for the treated Nafion 117 membrane and the untreated Nafion 117 membrane were measured at different concentrations of sodium bromide by the method as described in Example 1. The comparative results are given in FIG. 2 of the accompanying drawings from which it can be seen that the resistivity of the treated Nafion 117 membrane is not concentration dependent, whereas the resistivity of the untreated Nafion 117 membrane increases significantly with concentration.

EXAMPLE 3

A polyethylene tetrafluoride film radiation grafted with about 15% styrene and functionalized to contain about 17% sulfonic acid groups was obtained from RAI Corporation. The film had a thickness of about 0.0125 cm (0.005 inches).

This film was subjected to the same processing conditions as described in Example 2 in order to produce a treated film impregnated with a silver sulfide salt.

The ion exchange capacity of the treated RAI membrane was 0.74 meq/g as compared to 0.77 meq/g for the untreated RAI membrane.

EXAMPLE 4

A Neosepta CM1 membrane was pretreated by washing in high purity water using an ultrasonic bath for two hours. The membrane was then rinsed in high purity water. The membrane was then in the hydrogen ($H^+$) form.

The membrane was immersed in an aqueous solution of silver nitrate ($5 \times 10^{-3}$M), stirred continuously and kept in the dark for approximately 2 weeks.

The membrane impregnated with the silver salt was rinsed in high purity water, dried with paper towels and immersed in a concentrated solution of sodium sulfide (2.4M) for 24 hours at room temperature. The membrane was then rinsed several times with high purity water and the surfaces wiped clean to remove any excess precipitate. The membrane was then stored wet.

Figure 3:
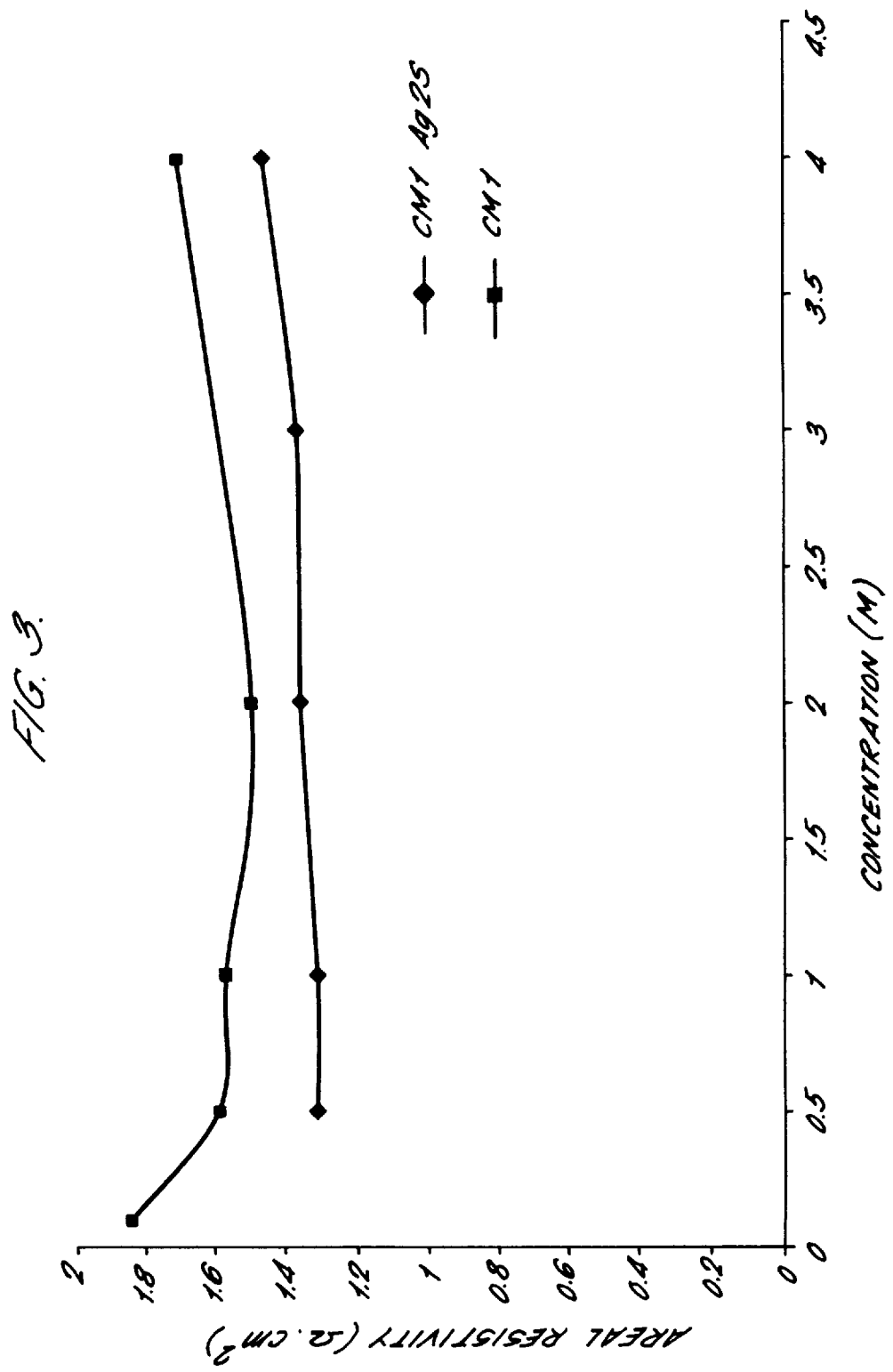
FIG. 3 is a graph showing resistivity vs. concentration for untreated and treated membranes according to Example 4.

The membrane resistances for the treated Neosepta CM1 membrane and the untreated Neosepta CM1 membrane were measured at different concentrations of sodium bromide by the method as described in Example 1. The comparative results are given in FIG. 3 of the accompanying drawings from which it can be seen that the resistivity of the treated Neosepta CM1 membrane does not vary significantly with concentration.

EXAMPLE 5

The procedure of Example 4 was repeated using a Neosepta CM2 membrane.

Figure 4:
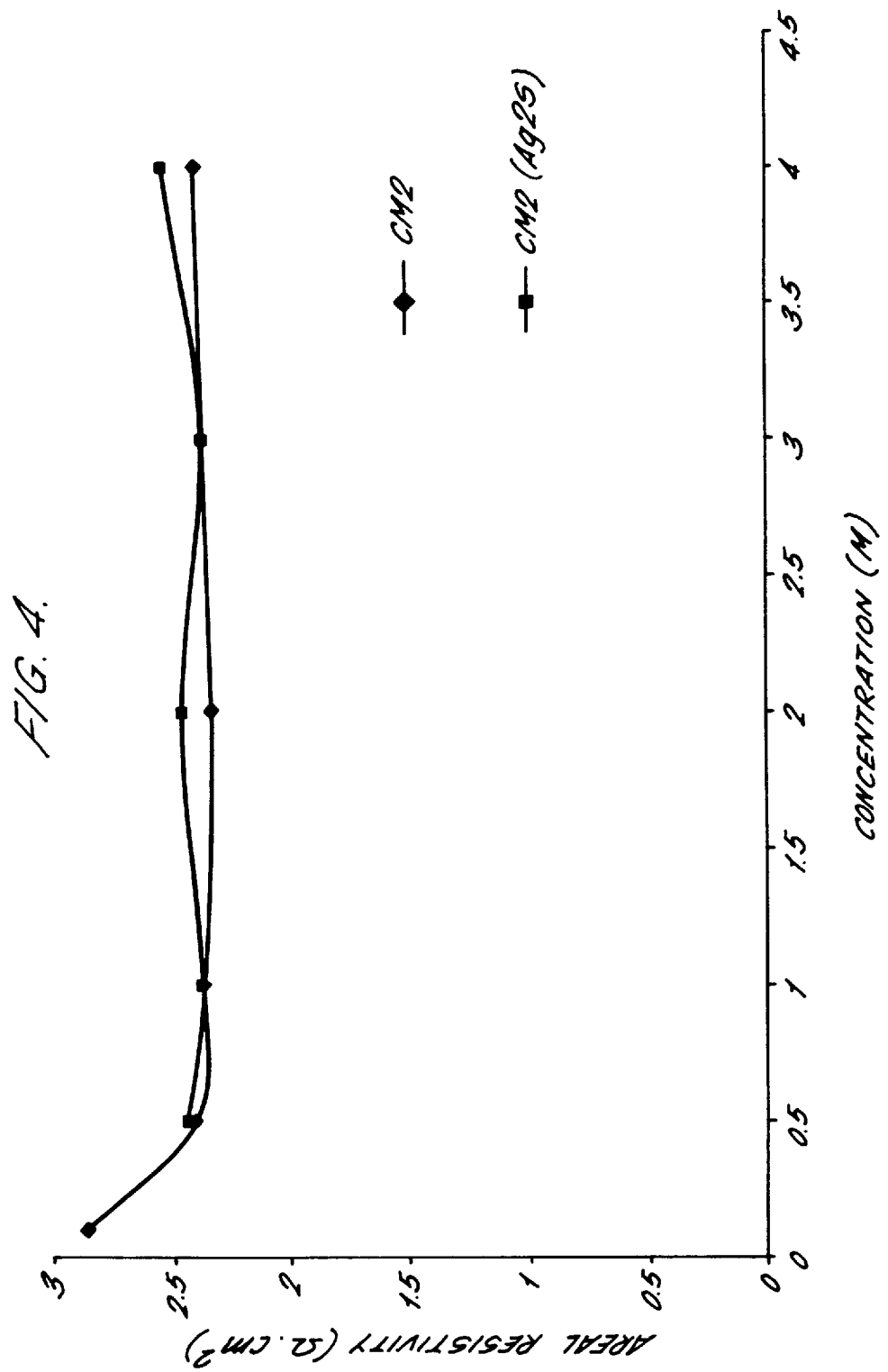
FIG. 4 is a graph showing resistivity vs. concentration for untreated and treated membranes according to Example 5.

The membrane resistances for the treated Neosepta CM2 membrane and untreated Neosepta CM2 membrane were measured at different concentrations of sodium bromide by the method as described in Example 1. The results are given in FIG. 4 of the accompanying drawings from which it can be seen that the resistivity of the treated and untreated Neosepta CM2 membranes are very similar.

EXAMPLE 6

A membrane having similar bromide precipitated within the polymer matrix was prepared according to the general procedures of Example 1 but substituting a solution of sodium bromide (30 g per liter solution) for the aqueous sodium sulfide solution. The immersion was effected for 10 minutes at 60° C. After this treatment the membrane was dried and it was noted that the membrane had a light brown color, as compared to the black colouration of the membranes of Example 1.

EXAMPLE 7

A Nafion 117 membrane was pretreated according to the procedure as described in Example 2 and then immersed in a 5 mM aqueous solution of molybdenum trichloride ($MoCl_3$), stirred continuously and kept in the dark for 4 days.

The membrane was rinsed with high purity water, dried with paper towels and immersed in a concentrated solution of sodium sulfide (2.4M) for 1 hour. The membrane was then rinsed several times with high purity water to remove excess sulfide.

It was noted that the Nafion membrane changed from being clear to having an orange tinge within 10 minutes of soaking in $Na_2S$.

EXAMPLE 8

A Neosepta CM1 membrane was pretreated according to the procedure as described in Example 4. The membrane was then immersed in a 5 mM aqueous solution of tungsten tetrachloride ($WCl_4$), stirred continuously and kept in the dark for 8 days.

The membrane was rinsed with high purity water, dried with paper towels and immersed in a concentrated solution of sodium sulfide (2.4M) for 1 hour. The membrane was then rinsed several times with high purity water to remove excess sulfide.

It was noted that the Neosepta CM1 membrane darkened on immersion in the $Na_2S$ solution.

EXAMPLE 9

The selectivity of the treated and untreated membranes of Examples 2, 3, 4 and 5 was compared by measuring the diffusion coefficients of the membranes. The diffusion coefficients were measured dynamically in a redox cell comprising the sodium bromide/sodium polysulfide system as described with reference to FIG. 1A of the accompanying drawings.

On diffusion through the membrane, sulfide is oxidized to sulfate by the receiving solution of sodium bromide which contains free bromine produced via oxidation of bromide ions at the $+^{ve}$ electrode. A current density of 40 $KAm^{-2}$ was used in all cases. The results are given in Table 4 below:

TABLE 4

| Membrane | Diffusion Coefficient ($m^2s^{-1} \times 10^{12}$) | |
| --- | --- | --- |
| | Standard untreated | AgS doped membrane |
| Nafion 117 | 4.55 | 3.19 |
| RAI | 9.97 | 7.71 |
| CM1 | 7.77 | 7.79 |
| CM2 | 4.81 | 1.33 |

We claim:

1. A method for the preparation of a modified cation exchange membrane having an ionic salt or hydroxide of a metal selected from the group consisting of silver, tungsten, molybdenum and a mixture thereof deposited within the polymer matrix, said ionic salt or hydroxide being insoluble in the electrolyte solutions which, in use, contact either side of the membrane, the method comprising the steps of i) contacting a cation exchange membrane with an aqueous solution of a water soluble salt of a metal selected from the group consisting of silver, tungsten, molybdenum and a mixture thereof, and ii) converting the water soluble salt from step (i) into an insoluble salt or insoluble hydroxide.

2. A method as claimed in claim 1 wherein the membrane is dehydrated prior to step (i).

3. A method as claimed in claim 1 wherein the water soluble salt from step (i) is converted into an insoluble bromide, chloride, sulfide or hydroxide.

4. A method as claimed in claim 3 wherein the conversion is effected by contacting the membrane from step (i) with a solution which is selected from the group consisting of bromide, chloride, sulfide and hydroxyl ion containing solution.

5. A method as claimed in claim 3 wherein the insoluble salt is a bromide and the conversion is effected by contacting the membrane from step (i) with bromine gas.

6. A method as claimed in claim 1 wherein dissimilar insoluble salts or insoluble hydroxides are formed on either side of the membrane.

7. A method as claimed in claim 6, wherein the dissimilar insoluble salts or insoluble hydroxides are formed by placing the membrane from step (i) in a reactor cell and exposing one surface to one reagent and the other surface to a different reagent, thereby to precipitate the insoluble salts or insoluble hydroxides.

8. A method as claimed in claim 7 wherein one surface of the membrane is exposed to a bromide containing solution to form an insoluble bromide and the other surface of the membrane is exposed to a sulfide containing solution to form an insoluble sulfide.

9. A method as claimed in claim 7 wherein one surface of the membrane is exposed to bromine gas to form an insoluble bromide and the other surface of the membrane is exposed to a sulfide containing solution to form an insoluble sulfide.

* * * * *